United States Patent
Schmid et al.

(10) Patent No.: US 9,407,746 B2
(45) Date of Patent: Aug. 2, 2016

(54) MOBILE ELECTRONIC DEVICE COMPRISING A SAPPHIRE COVER PLATE HAVING A LOW LEVEL OF INCLUSIONS

(71) Applicant: GTAT Corporation, Merrimack, NH (US)

(72) Inventors: Kurt Schmid, Marblehead, MA (US); Lukasz A. Glinski, Windham, NH (US)

(73) Assignee: GTAT Corporation, Merrimack, NH (US)

(*) Notice: Subject to any disclaimer, the term of this patent is extended or adjusted under 35 U.S.C. 154(b) by 103 days.

(21) Appl. No.: 14/139,179

(22) Filed: Dec. 23, 2013

(65) Prior Publication Data

US 2014/0185202 A1 Jul. 3, 2014

Related U.S. Application Data

(60) Provisional application No. 61/746,378, filed on Dec. 27, 2012.

(51) Int. Cl.
| | |
|---|---|
| *G06F 1/16* | (2006.01) |
| *H05K 5/00* | (2006.01) |
| *H05K 7/00* | (2006.01) |
| *H01L 21/00* | (2006.01) |
| *H04M 1/18* | (2006.01) |

(52) U.S. Cl.
CPC ............ *H04M 1/185* (2013.01); *Y10T 428/264* (2015.01); *Y10T 428/265* (2015.01)

(58) Field of Classification Search
CPC ....... G06F 1/16; G06F 1/1601; G06F 1/1637; G06F 1/1656; H04M 1/0202; H04M 1/0266
USPC .............. 361/679.01, 679.21–679.3, 679.02; 438/27, 30
See application file for complete search history.

(56) References Cited

U.S. PATENT DOCUMENTS

| | | | | |
|---|---|---|---|---|
| 4,088,799 | A * | 5/1978 | Kurtin | H01B 1/00 148/33.3 |
| 6,094,158 | A * | 7/2000 | Williams | A61H 3/061 342/157 |
| 6,982,181 | B2 * | 1/2006 | Hideo | G02F 1/136277 438/30 |
| 9,092,187 | B2 * | 7/2015 | Kwong | G06F 1/1601 |
| 2010/0060553 | A1 | 3/2010 | Zimmerman et al. | |
| 2010/0148293 | A1 | 6/2010 | Jain et al. | |
| 2012/0212399 | A1 | 8/2012 | Border et al. | |
| 2012/0212890 | A1 * | 8/2012 | Hoshino | H04M 1/0202 361/679.01 |

FOREIGN PATENT DOCUMENTS

| | | |
|---|---|---|
| JP | 08-320385 | 12/1996 |
| KR | 10-2010-0135492 | 12/2010 |

OTHER PUBLICATIONS

International Search Report dated Apr. 25, 2014 issued in connection with PCT/US2013/077971.

* cited by examiner

*Primary Examiner* — Anthony Haughton
(74) *Attorney, Agent, or Firm* — Parker Ibrahim & Berg LLC; Stephen D. LeBarron

(57) ABSTRACT

An electronic device comprising a cover plate is disclosed. The cover plate comprises one or more sapphire layers, wherein at least one of the layers has a low level of inclusions.

14 Claims, 1 Drawing Sheet

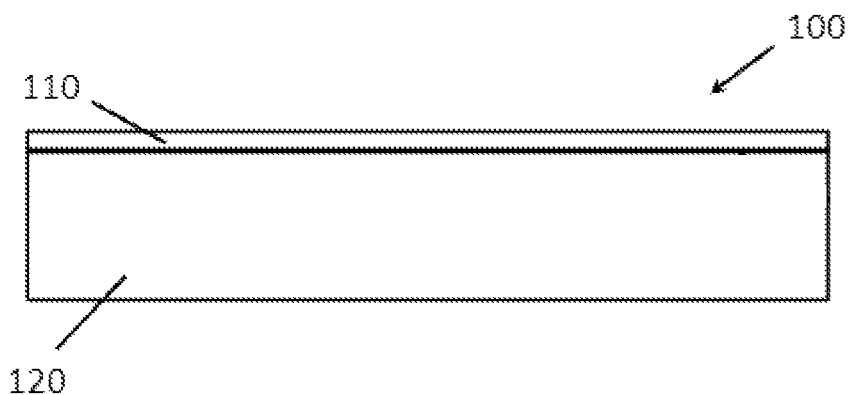

US 9,407,746 B2

MOBILE ELECTRONIC DEVICE COMPRISING A SAPPHIRE COVER PLATE HAVING A LOW LEVEL OF INCLUSIONS

CROSS REFERENCE TO RELATED APPLICATIONS

This application claims the benefit of U.S. Provisional Application Ser. No. 61/746,378 filed Dec. 27, 2012, the teachings of which are incorporated herein by reference.

BACKGROUND OF THE INVENTION

1. Field of the Invention

The present invention relates to a mobile electronic device comprising a sapphire cover plate.

2. Description of the Related Art

There are many types of mobile electronic devices currently available which include a display window assembly that is at least partially transparent. These include, for example, handheld electronic devices such media players, mobile telephones (cell phones), personal data assistants (PDAs), pagers, tablets, and laptop computers and notebooks. The display screen assembly may include multiple component layers, such as, for example, a visual display layer such as a liquid crystal display (LCD), a touch sensitive layer for user input, and at least one outer cover layer used to protect the visual display. Each of these layers are typically laminated or bonded together.

Many of the mobile electronic devices used today are subjected to excessive mechanical and/or chemical damage, particularly from careless handling and/or dropping, from contact of the screen with items such as keys in a user's pocket or purse, or from frequent touch screen usage. For example, the touch screen interfaces of smartphones and PDAs can become damaged by abrasions that scratch and pit the physical user interface, and these imperfections can act as stress concentration sites making the screen and/or underlying components more susceptible to fracture in the event of mechanical or other shock. Additionally, oil from the use's skin or other debris can coat the surface and may further facilitate the degradation of the device. Such abrasion and chemical action can cause a reduction in the visual clarity of the underlying electronic display components, thus potentially impeding the use and enjoyment of the device and limiting its lifetime.

Various methods and materials have been used in order to increase the durability of the display windows of mobile electronic devices. For example, polymeric coatings or layers can be applied to the touch screen surface in order to provide a barrier against degradation. However, such layers can interfere with the visual clarity of the underlying electronic display as well as interfere with the touch screen sensitivity. Furthermore, as the coating materials are often also soft, they can themselves become easily damaged, requiring periodic replacement or limiting the lifetime of the device.

Another common approach is to use more highly chemically and scratch resistant materials as the outer surface of the display window. For example, touch sensitive screens of some mobile devices may include a layer of chemically-strengthened alkali aluminosilicate glass with potassium ions replacing sodium ions for enhanced hardness, such as the material referred to as "gorilla glass" available from Corning. However, even this type of glass can become scratched by many harder materials, including metal keys, sand, and pebbles, and, further, as a glass, is prone to brittle failure and shattering. Sapphire has also been suggested and used as a material for either the outer layer of the display assembly or as a separate protective sheet to be applied over the display window. However, sapphire is relatively expensive and typically contains imperfections and impurities that can act as sites for light scatter, reflection, and light transmission losses, thereby interfering with the display feature of the device and reducing the quality of the viewed image.

Thus, while materials are available which can enable the display of a mobile electronic device to be relatively resistant to damage, there remains a need in the industry for materials and methods for providing improved mechanical toughness and scratch resistance without reducing transmittance.

SUMMARY OF THE INVENTION

The present invention relates to an electronic device comprising a cover plate having at least one transparent display region. The cover plate comprises at least one sapphire layer having no inclusions with a size greater than 0.05 mm. Preferably, the sapphire layer has no inclusions with either a length or diameter greater than 0.05 mm. Also, preferably the sapphire layer has no inter-inclusion distances less than 2.0 mm and, further, has a total area of inclusion that is less than 2.0 mm in a 2.5 cm$^2$ area. The electronic device may further comprise at least one display element having a display surface, and the cover plate can be either affixed to the display surface or can be removably positioned on top of the display surface as a protective layer.

[It is to be understood that both the foregoing general description and the following detailed description are exemplary and explanatory only and are intended to provide further explanation of the present invention, as claimed.

BRIEF DESCRIPTION OF THE DRAWINGS

FIG. 1 illustrates the cover plate of the electronic device of the present invention.

DETAILED DESCRIPTION OF THE INVENTION

The present invention relates to an electronic device comprising a cover plate, wherein the cover plate comprises at least one sapphire layer having a low level of inclusions.

As shown in FIG. 1, the electronic device 100 of the present invention comprises a cover plate 120 having at least one transparent display region through which an image can be displayed, such as from a display element 120 upon which the cover plate is placed. Non-transparent regions may also be present, particularly as decorative elements such as borders or as elements to delineate various functional sections of the display. The electronic device can be any known in the art comprising a display or display element, such as mobile or portable electronic devices including, but not limited to, electronic media players for music and/or video, such as an mp3 player, mobile telephones (cell phones), personal data assistants (PDAs), pagers, laptop computers, or electronic notebooks or tablets. The display element of the device may include multiple component layers, including, for example, a visual display layer such as an LCD and a touch sensitive layer as part of a touch screen application. The cover plate can be affixed to the display surface of the display element of the device or it can be a separate protective layer that can be placed or positioned over or on top of the display element and later removed if desired.

The cover plate 100 of the electronic device of the present invention comprises a sapphire layer 110 having a low level of inclusions, described in more detail below. The cover plate may be a single, free-standing sapphire layer or it may comprise additional layers, including additional sapphire layers or layers of other materials capable of providing further beneficial properties, such as improved mechanical or surface properties, including hardness or resistance to cracking. For example, the cover plate may comprise an antireflective and/or oleophobic coating, typically having a thickness of from about 0.001 microns to about 1.5 microns. Thus, the cover plate can be a multilayer composite comprising, for example, 2-10 layers, such as 2-5 layers or 2-3 layers, wherein at least one layer is a sapphire layer having a low level of inclusions. Preferably, particularly for cost reasons, the cover plate comprises a single layer of low inclusion-containing sapphire.

The thickness of the sapphire layer can vary depending on, for example, the type and size of the electronic device, cost, and the desired properties of the cover plate. For example, for cost reasons, thinner layers are preferred, and the thickness of the sapphire layer can be less than about 3 mm, such as from about 0.01 mm to about 3 mm, including less than about 2 mm, such as less than about 1 mm, less than about 0.5 mm, or less than about 0.1 mm. In addition, the sapphire layer may be an ultrathin sapphire layer, such as can be prepared from a sapphire donor using an ion implantation method, having a thickness of less than 50 microns, including, for example, less than 30 microns, less than 25 microns, less than 20 microns, or even less than 15 microns. Preferably, the sapphire layer is free-standing and is therefore able to be handled independently of a carrier layer.

The overall thickness of the cover plate of the electronic device of the present invention can vary depending on a variety of factors, including, for example, the number of layers and the desired size and weight of the electronic device. In general, the cover plate has a thickness that is less than about 5 mm and preferably has a thickness of from about 0.3 mm to about 3.0 mm. However, since the cover plate of the present invention comprises at least one layer of sapphire having low levels of inclusions, which can act as sites for light loss and display picture compromise, the present cover plates can be thinner than cover plates comprising currently available sapphire as well as cover plates comprising glass while, at the same time, achieving the same level of desired properties such as touch screen sensitivity, rigidity, and strength. Thus, for example, the cover plate more preferably has a thickness between about 0.4 mm to about 2.5 mm, even more preferably from about 0.5 mm to about 2.0 mm, and most preferably between about 0.5 mm and about 1.0 mm.

In the present invention, at least one of the sapphire layers has a low level of inclusions. As used herein, the term "inclusions" refers to any object or visible impurity included within the sapphire layer that causes scattering and reflection of light. Examples of inclusions include bubbles, gas, particles, or other visible objects, and these can be of varying sizes and shapes. Inclusions can become incorporated within the sapphire material from a variety of sources, but generally are a result of the process by which the sapphire is produced. Typically, currently available sapphire, which is prepared using any of a variety of crystal growth and solidification processes, have generally high levels of relative large inclusions. For example, typically sapphire has inclusions that, on average, are about 0.1 mm in size and can even be even larger, such as from about 0.1 mm to about 1.0 mm on average. These can be dispersed within the material either uniformly or, in some cases, non-uniformly. Thus, the distance between inclusions (herein referred to as the inter-inclusion distance) can vary. Clumping of inclusions results in low inter-inclusion distances, and these have a particularly large effect on the optical properties of sapphire.

By comparison, the sapphire layer of the cover plate used in the electronic device of the present invention has a considerably lower level of inclusions. In particular, the sapphire material of the present cover plate has no inclusions that are larger than 0.05 mm in size, measured either in length or diameter, depending on the overall shape of the inclusion. Preferably, any inclusions present in the sapphire layer are smaller than 0.04 mm, such as less than 0.03 mm, or less than 0.025 mm in size. Also, preferably, the sapphire layer has no inclusions that are closer than 2.0 mm, and therefore, the sapphire layer has no inter-inclusion distance that is less than 2.0 mm. More preferably, the distance between all inclusions is greater than 2.0 mm, such as greater than 3.0 mm and greater than 4.0 mm. Furthermore, the sapphire layer also preferably has a very low number of total inclusions. In particular, the total area of inclusions is very low, and is preferably less than 2.0 mm, including less than 1.5 mm and less than 1.0 $mm^2$ in any 2.5 $cm^2$ area of the sapphire layer. Thus, the sapphire layer has few inclusions, and those that are present are relatively small in size and relatively uniformly distributed throughout the layer. Such a sapphire layer would be expected to have significantly improved optical properties compared to currently available material and would therefore be useful in a variety of application, particularly in a cover plate for an electronic device where high optical performance is critical.

The sapphire layer preferably further has desirable mechanical, physical, and/or optical properties. For example, at room temperature, the layer of sapphire preferably has a flexural strength of at least about 700 MPA, including between about 800 and 1000 MPa, a fracture toughness (i.e., the ability of the material containing a crack or scratch to resist fracture) of greater than 1 MPa, including between about 2 and 5 MPa, a Knoop hardness of greater than about 15 GPa, including between about 17 and about 20 GPa, and/or a Vickers hardness of greater about 1000 kg/m, including between about 2000 and 3000 kg/m. The modulus, such as the Young's modulus, is also preferably between about 300-400 GPa, but can vary depending on the desired properties of the cover plate (such as touch sensitivity).

The sapphire layer of the cover plate can be prepared using any method known in the art. For example, the sapphire layer can be sawn or cut from a larger bulk sapphire crystal that has been prepared in a crystal growth apparatus, which is a high-temperature furnace capable of heating and melting solid feedstock, such as alumina, in a crucible at temperatures generally greater than about 1000° C., including greater than about 2000° C., and subsequently promoting resolidification of the resulting melted feedstock material to form a crystalline material, such as a sapphire boule. Preferably, the sapphire body is prepared in a heat exchanger method crystal growth furnace, in which a crucible comprising alumina feedstock and at least one single crystal sapphire seed is heated above its melting point to melt the feedstock without substantial melting of the seed, and the heat is then removed from the crucible using a heat exchanger, such as a helium-cooled heat exchanger, provided in thermal communication with the bottom of the crucible and positioned under the seed. This method has been shown to produce large, high quality sapphire bodies, sometimes referred to as boules, from which the sapphire layers can be removed. Control over inclusions can result from a variety of techniques, including purity of feedstock and/or process control conditions.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

The invention claimed is:

1. An electronic device comprising
at least one display element having a display surface; and
a cover plate for the at least one display element having at least one transparent display region, the cover plate comprising at least one sapphire layer having no inclusions with a size greater than 0.05 mm.

2. The electronic device of claim 1, wherein the sapphire layer has no inclusions with a length greater than 0.05 mm.

3. The electronic device of claim 1, wherein the sapphire layer has no inclusions with a diameter greater than 0.05 mm.

4. The electronic device of claim 1, wherein the sapphire layer has no inter-inclusion distance less than 2.0 mm.

5. The electronic device of claim 1, wherein the sapphire layer has a total area of inclusions of less than 2.0 mm$^2$ in a 2.5 cm$^2$ area.

6. The electronic device of claim 1, wherein the cover plate is affixed to the display surface.

7. The electronic device of claim 1, wherein the cover plate is a protective layer removably positioned on top of the display surface.

8. The electronic device of claim 1, wherein the sapphire layer comprises sapphire solidified in a crystal growth furnace.

9. The electronic device of claim 8, where the crystal growth furnace is a heat exchanger method furnace.

10. The electronic device of claim 1, wherein the cover plate has thickness between about 0.3 and 3.0.

11. The electronic device of claim 1, wherein the cover plate has thickness between about 0.4 and 2.5.

12. The electronic device of claim 1, wherein the cover plate has thickness between about 0.5 and 1.0.

13. The electronic device of claim 1, wherein the cover plate further comprises an exterior anti-reflective layer.

14. The electronic device, of claim 1, wherein the electronic device is an electronic media player, a mobile telephone, a personal data assistant, a pager, a tablet, a laptop computer, or an electronic notebook.

* * * * *